United States Patent [19]

Roob

[11] 3,827,451

[45] Aug. 6, 1974

[54] QUICK RELEASE VALVE
[75] Inventor: Elwood I. Roob, Parma, Ohio
[73] Assignee: Eaton Corporation, Cleveland, Ohio
[22] Filed: May 21, 1973
[21] Appl. No.: 361,912

Related U.S. Application Data
[60] , Division of Ser. No. 127,691, March 24, 1971, Pat. No. 3,734,258.

[52] U.S. Cl. .............................. 137/102
[51] Int. Cl. ...................... F16k 11/00, F16d 25/04
[58] Field of Search .......... 137/102, 625.68; 181/69

[56] References Cited
UNITED STATES PATENTS
| | | | |
|---|---|---|---|
| 2,488,949 | 11/1949 | Walsh | 137/102 X |
| 2,706,487 | 4/1955 | Wilson | 137/102 |
| 2,764,174 | 9/1956 | Wilson | 137/102 |
| 3,556,735 | 1/1971 | Epelman | 181/69 X |
| 3,559,760 | 2/1971 | Ninomiya | 181/69 X |

Primary Examiner—William R. Cline
Attorney, Agent, or Firm—Teagno & Toddy

[57] ABSTRACT
A drive for transmitting torque from a driving to a driven member includes an inflatable member which is adapted to connect the driving and driven members when inflated by a fluid under pressure. The drive includes a valve assembly having an inlet connected to a fluid supply, a first outlet in communication with the inflatable member and a second outlet for venting the inflatable member. The valve assembly has a movable valve member which has a first position for restricting fluid flow between the inlet and the first and second outlets while providing for fluid communication between the first and second outlets. When fluid is supplied under pressure to the inlet, the valve member has a surface area against which the fluid acts to move the valve member from the first position to a second position. In the second position, the valve member restricts fluid flow between the first and second outlets while providing for fluid communication between the inlet and the first outlet which effects inflation of the inflatable member, resulting in the driving and driven members being drivingly connected thereby. A muffler may be utilized in connection with the second outlet to control the level of noise associated with the operation of the valve.

6 Claims, 3 Drawing Figures

QUICK RELEASE VALVE

This is a continuation of application Ser. No. 219,911, filed Jan. 21, 1972, now abandoned, which in tern was a division of application Ser. No. 127,691, filed Mar. 24, 1971, now U.S. Pat. No. 3,734,258.

BACKGROUND OF THE INVENTION

The present invention relates to a drive for drivingly connecting relatively rotatable driving and driven members by means of a fluid actuated clutch or to a brake for stopping a relatively rotating member by means of a fluid actuated brake. Particularly the invention relates to a fluid actuated clutch or brake of the inflatable member type, and more particularly relates to a drive having a valve assembly for supplying fluid under pressure to the inflatable member.

A drive having an inflatable member for drivingly connecting relatively rotatable driving and driven members is known. Such a drive includes a valve assembly for controlling the fluid flow to the inflatable member. An example of such a drive is shown in Eakin Pat. No. 2,879,868. When fluid pressure is supplied to the valve assembly, it is allowed to flow through the valve assembly into the inflatable member. The fluid pressure expands the inflatable member to effect a driving connection between the driving and driven members. When fluid pressure is no longer supplied to the valve assembly, fluid is exhausted from the inflatable member through the valve assembly such that the driving and driven members are no longer drivingly connected. Thus, it may be seen that the driving connection may be effected by supplying the valve assembly with fluid under pressure. On the other hand, such a drive will automatically disengage the driving and driven members when pressurized fluid is not supplied to the valve assembly.

The valve assemblies of the prior art, designed to function in the afore-mentioned manner, have a considerable number of parts and require a considerable number of machining operations in manufacture. These machining operations are required in order to maintain alignment of the movable valve members with respect to the valve body. If there are machining errors in these prior art devices, the valve member would not operate properly thus creating a malfunction in the drive with which it was used. A further requirement of the prior art devices is close tolerance machining operations. If certain close tolerances are not held, the valves cannot provide effective sealing of the fluid. Moreover, the simplicity of the present invention provides a long life for the valve assembly.

The present invention overcomes the above-noted problems of the prior art by providing a valve assembly having few parts and which may be readily machined. Moreover, the valve assembly of the present invention includes a sliding valve member which is maintained in alignment with the valve body by means of a tapered portion of the sliding valve member which mates with a tapered opening in the valve body. This construction eliminates the need for special machining operations required in order to maintain alignment of the valve member with respect to the valve body. In addition, the present invention provides a valve member which presents a substantial area to the fluid under pressure when the fluid pressure exceeds a predetermined level. This allows the valve member to stay in a position wherein the pressurized fluid is supplied to the inflatable member.

An object of this invention is to provide a new and improved fluid actuated clutch or brake.

Another object of the present invention is the provision of a new and improved drive having driving and driven members and an inflatable member for drivingly connecting the members, and wherein the inflation of the inflatable member is controlled by a valve assembly of a simplified design which may be readily manufactured and is extremely durable.

It is a further object of the present invention to provide a new and improved drive having driving and driven members and an inflatable member for drivingly connecting the members, and wherein the inflation of the inflatable member is controlled by a valve assembly having a valve member in the form of a slidable member.

It is a further object of this invention to provide an improved valve assembly for operating a fluid actuated device.

It is another object of the present invention to provide a new and improved drive having driving and driven members and an inflatable member for drivingly connecting the members, and wherein the inflation of the inflatable member is controlled by a valve assembly having an inlet and an outlet and wherein a movable valve member is maintained in alignment with the valve inlet and outlet by means of a tapered member protruding from the valve member and slidably received in an opening in the valve body.

It is yet another object of the present invention to provide a new and improved drive having driving and driven members and an inflatable member for drivingly connecting the members and wherein the inflation of the inflatable member is controlled by a valve assembly which requires a minimum amount of machining.

It is a further object of the present invention to provide a new and improved drive having driving and driven members and an inflatable member for drivingly connecting the members and wherein the inflation of the inflatable member is controlled by a valve assembly having an inlet and first and second outlets and a valve member operable in the position to connect the inlet with the first outlet while sealing the first outlet from the second outlet and operable in another position to seal the inlet from the first outlet and communicate the first outlet with the second outlet.

It is a further object of the present invention to provide a new and improved device having a valve with a fail-safe mode of operation.

Further objects, advantages, and features of the present invention will be apparent to those skilled in the art to which it relates from the following detailed description thereof made with reference to the accompanying drawings forming a part of this specification and in which.

DETAILED DESCRIPTION OF THE INVENTION

Figure 1:
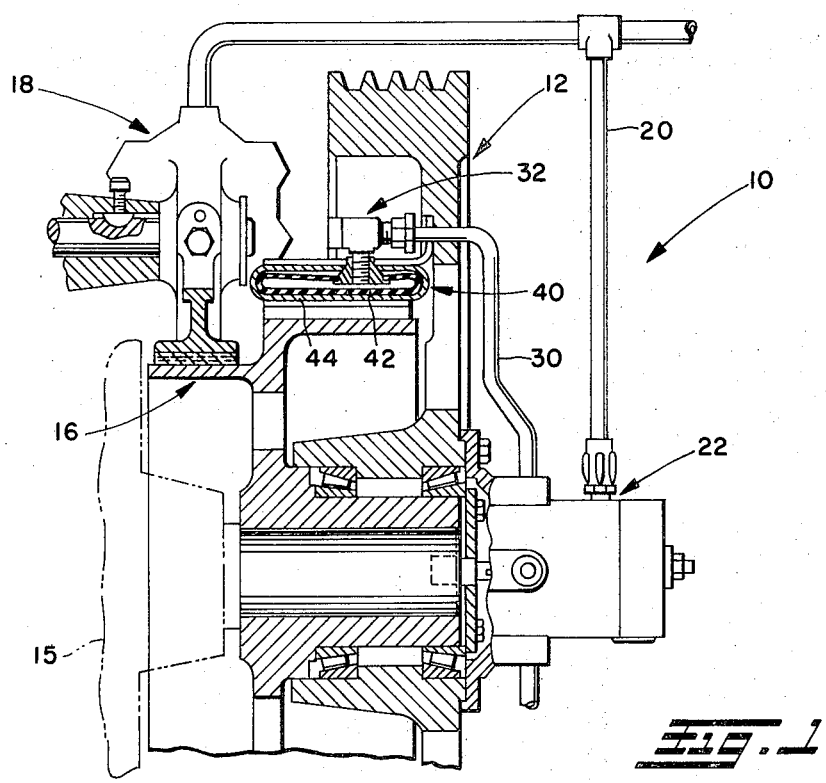
FIG. 1 is a fragmentary sectional view of a drive having a driving and driven member adapted to be drivingly connected by an inflatable member and embodying the immediate invention.

The present invention provides a new and improved drive for drivingly connecting relatively rotatable driving and driven members by means of an air actuated clutch including an inflatable member. While an air actuated clutch of the inflatable member type is used for illustrative purposes, it is understood that other air actuated devices, such as air piston clutches or brakes and diaphragm clutches or brakes are equally suitable applications for the present invention. A valve assembly is connected to the inflatable member for supplying fluid under pressure to the inflatable member such that the inflatable member may be inflated to drivingly connect the driving and driven members. The immediate invention simplifies the valve assembly and minimizes the amount of machining required to manufacture the valve assembly without detrimentally affecting the operational characteristics of such a valve. One such drive system is representatively shown in FIG. 1 in connection with a press 10 for drivingly connecting the driving and driven members of the press.

The press 10 has a driving member 12 and a driven member 16 which are mounted so that they are relatively rotatable. A resiliently inflatable member 40 is provided for drivingly connecting the driving and driven members 12, 16, respectively. A valve assembly 32 is provided for supplying fluid under pressure to the inflatable member 40. When fluid pressure is supplied to the inflatable member 40, the driving member 12 is connected to the driven member 16 such that torque is transmitted therebetween. When the fluid pressure is exhausted from the inflatable member 40, it deflates, and, consequently, torque transmission from the driving member 12 to the driven member 16 is terminated.

The driving member 12 of the press 10 is connected to a motor (not shown) by means of a plurality of belts. The motor rotates at a constant speed and drives the driving member which is in the form of a flywheel. The press 10 includes a crankshaft 15 to which the driven member 16 is drivingly connected. The crankshaft 15 is operatively connected to a press ram such that the press ram will move along a path for performing standard press functions, as is well known to those skilled in the art, upon rotation of the crankshaft.

When a press operator requires movement of the press ram, a switch is tripped by the press operator to supply pressurized fluid to the valve assembly 32. The valve assembly 32 directs the fluid to the inflatable member 40 such that it is inflated. The inflatable member 40 drivingly connects the driving member 12 to the driven member 16 upon inflation to effect movement of the press ram. When a sufficient number of strokes of the press ram have occurred, the press operator terminates the supply of pressurized fluid to the valve assembly 32. The inflatable member 40 then deflates and the driving member 12 and driven member 16 are drivingly disconnected.

The press 10 also includes a brake 18 which is simultaneously actuated in conjunction with the disconnection of the members 12, 16 to stop the driven member 16. The brake 18 is of a conventional construction, well known to those in the art, and does not comprise a part of the immediate invention. Accordingly it will not be described in detail.

The fluid supply is operable to supply a fluid, such as air, under pressure to the valve assembly 32 by means of conduits 20 and 30. The switch which is tripped by the press operator is positioned in the conduit 20 to prohibit the supply of pressurized fluid to the valve assembly 32, but operable upon actuation to direct pressurized fluid thereto. The conduit 20 is connected to a rotary seal device 22 which may be of conventional construction, well known to those skilled in the art. A conduit 30 is connected to the rotary seal device 22 for supplying fluid under pressure to the valve assembly 32.

Figure 2:
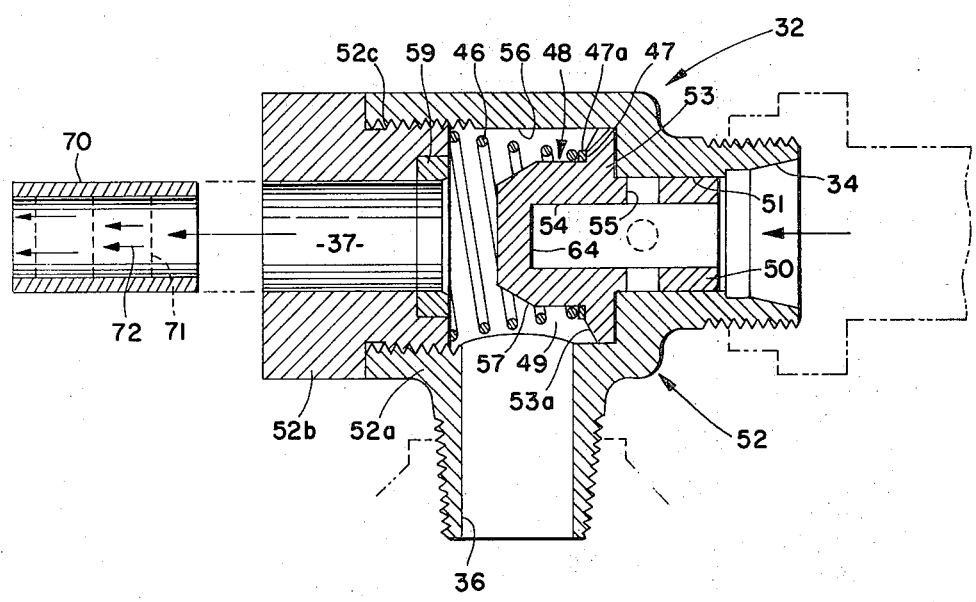
FIG. 2 is a sectional view showing the valve assembly of the present invention with parts in one position.
Figure 3:
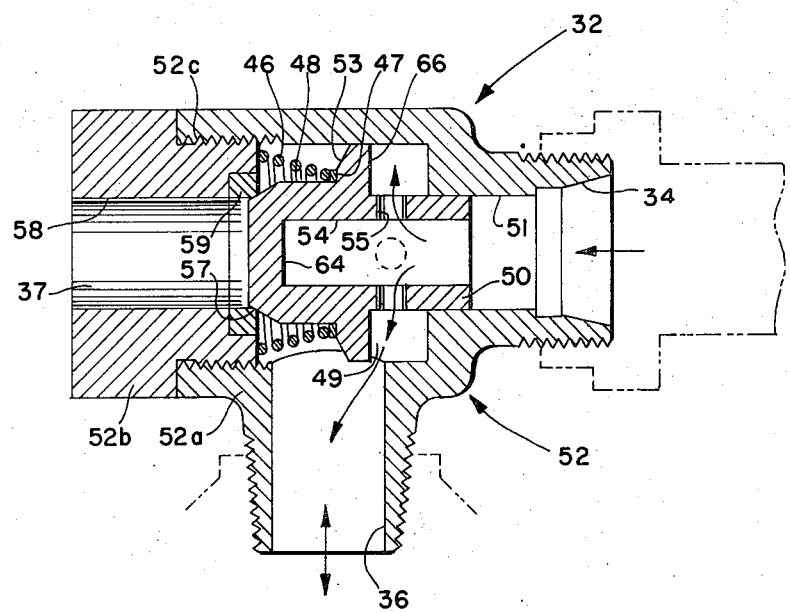
FIG. 3 is a sectional view of the valve assembly of FIG. 2 showing parts in another position.

The valve assembly 32, as seen in FIG. 2, includes a valve body 52 having an inlet 34 and a first outlet 36 connected with the inflatable member 40. The valve body 52 has a second outlet 37 connected with the atmosphere. The inlet 34 and outlets 36, 37 communicate with a chamber 49 in the valve body 52. The chamber 49 is adapted to receive a slidable valve member 48. When the valve member 48 is in its first position, as shown in FIG. 2, fluid flow from the inlet 34 to the outlet 36 is restricted and any pressurized fluid in the inflatable member 40 is exhausted through the outlet 37. When the valve member 48 is moved to the second position, as shown in FIG. 3, the fluid flow from the outlet 36 to the outlet 37 is restricted, and fluid flows from the inlet 34 to the outlet 36 to inflate member 40.

The inflatable member 40 has a friction surface 42 which is adapted upon inflation to engage a complementary friction surface 44 on the driven member 16 such that the driving member 12 is drivingly connected to the driven member 16 thereby. The valve assembly 32 automatically operates to allow the pressurized fluid in the inflatable member 40 to exhaust through the second outlet 37 when fluid pressure is removed from inlet 34. As a result, the inflatable member 40 retracts, whereupon the driving member 12 is no longer drivingly connected to the driven member 16.

As shown in FIG. 2, the valve body 52 includes a body member 52a and a plug member 52b suitably secured in the valve body 52a as by a threaded connection 52c therebetween. Biasing means 42, such as a spring, are provided to maintain the valve member 48 in a position blocking communication between inlet 34 and either outlet when pressurized fluid is not supplied to the inlet 34. The biasing means acts between the plug member 52b and a spring seat 47 on the valve member 48. Spring seat 47 may additionally include a wear ring 47a to reduce the wear between the seat 47 and spring 46. Valve member 48 includes a smaller diameter portion 50 which is sealingly engaged by and slidably disposed within a bore 51 of the valve body 52. Adjacent the smaller diameter portion 50 is a flanged section 53. Flanged section 53 is sealingly and slidably engaged by interior walls 56 of valve body 52 which define chamber 49. Flange 53 includes a tapered section portion 53a. The valve member also has an axial bore 54 extending partially therethrough. A plurality of radial bores 55 communicate the axial bore 54 with the exterior of smaller diameter portion 50, axial bore 54 opens to inlet 34. In the position shown in FIG. 2, radial bores 55 are maintained in sealing contact with valve body bore 51 and valve member flange 53 seals chamber 49 from inlet 34.

Adjacent the flange section 53 of valve member 48 is a tapered section 57 which extends towards the second outlet 37 of the valve body 52. The second outlet 37 is equipped with an annular valve seat 59 which is generally concave to readily mate with tapered section 57 eliminating the requirement for precise and expensive machining to assure perfect alignment. Second outlet 37 communicates with the atmosphere and may include a muffler 70. Annular valve seat 59 may be of rubber or other suitable sealing materials.

It should be noted that muffler 70 may be formed as an integral part of plug member 52b. The muffler should be of the type which is highly efficient in reducing level while offering a minimum obstruction to exiting air. A muffler with a plurality of baffles 71 in the airstream 72 and normal thereto has been found to be very effective for this application.

When fluid is supplied to the inlet 34 with sufficient pressure to move the member 48 with respect to the spring biasing means 46, the valve member 48 moves to the position shown in FIG. 3. The first effective area of the valve member 48 presented to the inlet 34 prior to movement is generally designated at 64, and is defined by the area in cross-section of bore 51. As the valve member 48 moves sufficiently away from the fluid sealing bore 54 to allow radial bores 55 to communicate with valve chamber 49, a second area generally indicated at 66, is presented to the fluid pressure in the inlet 34. This second area 66 is equal to the area of the member 48 defined by the major diameter of the valve member 48 minus the area defined by smaller diameter portion 50. Second area 66 has an opposing area on the opposite side of flange 53a which will not be exposed to inlet pressure until such time as inlet 34 is in fluid communication with outlet 36.

When a predetermined amount of fluid pressure is applied through the inlet 34 to the first area 64 of valve member 48, the biasing means is overcome and the valve member 48 moves toward the second position, as shown in FIG. 3. Fluctuations in fluid pressure supply to the inlet 34 will not allow the valve member 48 to return to the position shown in FIG. 2, since the second area 66 of the valve member 48 will not be exposed to inlet pressure as the valve member 48 moves sufficiently towards the inlet 34 to block fluid communication between the inlet 34 and the outlet 36, thus at this position rendering second area 66 exposed to inlet pressure and effectively unopposed. It is only when the inlet fluid pressure drops significantly below the predetermined level required to move valve member 48 from the first position that the valve member 48 will return to the first position.

When the valve member 48 moves to the position of FIG. 3, the tapered surface 57 engages valve seat 59 and seals first outlet 36 from fluid communication with second outlet 37. When the valve member 48 is in this position, fluid flows from the source of pressurized fluid into inlet 34; through bore 51 into axial bore 54, through radial bores 55 into chamber 49 past flange 53 out the outlet 37 to inflatable member 40.

When the fluid pressure in the inlet 34 is removed, the biasing spring 46 and the pressure of exiting fluid from the inflatable member 40 acting on the tapered portion 53a of flange 53 quickly move the valve member 48 to the right, sealing radial bores 55 in bore 51 thus blocking the inlet 34. Because of this movement of the valve member 48, the first outlet 36 is communicated with second outlet 37. As a result, fluid in the inflatable member 40 exhausts through outlet 36, chamber 49 in the valve body 52, and outlet 37. This results in deflation of the inflatable member 40.

It should be noted that the pressure of fluid exiting from inflatable member 40 acting upon tapered surface 57 and 53a is sufficient to shift the valve member 48 to the right in the event of a failure of spring 46. This feature provides a reliable fail safe mode of operation for valve member 32.

The valve assembly 32 as should be apparent from the above, has a minimum of parts and requires a minimum of machining as compared with the known valve assemblies for performing the functions of valve assembly 32. The valve 32 is operative so that when sufficient fluid pressure is supplied thereto, the inflatable member 40 is quickly inflated and the driving and driven members 12, 16, respectively, are drivingly connected. When the fluid pressure is removed, the valve assembly 32 is operative to allow the fluid in the inflatable member to be quickly discharged therefrom such that the driving and driven members are no longer drivingly connected.

The valve assembly 32 of the immediate invention includes a valve body 52 having an inlet 34 connected to the fluid supply, a first outlet 36 in communication with the inflatable member 40 and a second outlet 37. When the valve member 48 is in a first position, the fluid in the inflatable member 40 is free to discharge therefrom so that the driving and driven members 12, 16, respectively are disengaged. When sufficient pressure is supplied to the inlet 34, the valve member 48 moves to a second position which restricts flow from the inflatable member 40 from the first outlet 36 through the second outlet 37. The fluid pressure supplied through inlet 34 flows through the first outlet 36 to expand the inflatable member and drivingly connect the driving member 12 to the driven member 16.

Having thus described my invention, I claim:

1. A valve assembly for fluid operated devices comprising:
a housing having an inlet, a supply outlet connected to said fluid operated device, an exhaust outlet and a chamber interposed said inlet and said outlets, said housing having an elongate bore interposed said inlet and said chamber and an annular valve seat interposed said chamber and said exhaust outlet, said annular valve seat coaxial with said elongate bore and across said chamber therefrom;
a one-piece valve member having a first and second position, said valve member establishing fluid communication between said exhaust outlet and said supply outlet and blocking communication between said outlets and said inlet in said first position and establishing fluid communication between said inlet and said supply outlet and blocking communication between said chamber and said exhaust outlet in said second position, said valve member having a substantially cylindrical portion axially slidable and sealingly engaged in said elongate bore, a tapered portion extending towards said annular valve seat, and a radially extending flanged portion axially interposed said cylindrical and tapered portions, the circumference of said flanged portion slidably and sealingly engaging said chamber, the circumference of said flanged portion sealing said elongate bore from said supply outlet in said first position and communicating said elongate bore and said supply outlet in said second position, said valve member having an axial bore for communication with said inlet and at least one radial bore communicating said axial bore with the surface of said cylindrical section, said radial bore sealed by said elongate bore in said first position and communicating with said chamber when said valve moves towards said second position, said flange thus forming an unopposed area exposed to inlet fluid pressure when said radial bore is in communication with said chamber and said inlet is blocked from said supply outlet to provide more rapid movement of the valve member towards its second position and to prevent said one-piece valve member from moving from said second to said first position as a result of mere momentary fluctuations in inlet fluid pressure, said tapered portion engaging said annular valve seat whereby said exhaust outlet is sealed from said chamber when said one-piece valve member is in said second position, said one-piece valve member biased by fluid pressure in said inlet to move from said first to said second position; and spring biasing means for biasing said valve member to said first position.

2. The valve assembly of claim 1 wherein said exhaust outlet includes a sound muffling device therein.

3. The valve assembly of claim 2 wherein said sound muffling device comprises at least one perforated baffle arranged normally to the flow of fluid through said exhaust outlet.

4. The valve of claim 1 additionally comprising a tapered area opposite said flanged area, said tapered area exposed to fluid pressure in said supply outlet, supply outlet fluid pressure acting upon said tapered area being effective to move said valve member from its second to its first position when supply of inlet pressure is interrupted.

5. The apparatus of claim 1 wherein said second outlet includes a sound muffling device to muffle the sound of exhausting fluids.

6. The valve of claim 1 wherein said supply outlet pressure is effective to move said valve member from its second to its first position upon interruption of inlet fluid pressure in the event of failure of said biasing means.

* * * * *